(12) United States Patent
Uchiyama

(10) Patent No.: US 9,479,725 B2
(45) Date of Patent: Oct. 25, 2016

(54) LENS APPARATUS AND A CAMERA SYSTEM

(71) Applicant: CANON KABUSHIKI KAISHA, Tokyo (JP)

(72) Inventor: Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 14/212,347

(22) Filed: Mar. 14, 2014

(65) Prior Publication Data

US 2014/0267831 A1 Sep. 18, 2014

(30) Foreign Application Priority Data

Mar. 15, 2013 (JP) ................................ 2013-054152

(51) Int. Cl.
*H04N 5/77* (2006.01)
*H04N 5/232* (2006.01)

(52) U.S. Cl.
CPC .......... *H04N 5/772* (2013.01); *H04N 5/23209* (2013.01); *H04N 5/23212* (2013.01); *H04N 5/23296* (2013.01)

(58) Field of Classification Search
CPC .......................... H04N 5/772; H04N 5/23212
USPC ...................................................... 348/231.6
See application file for complete search history.

(56) References Cited

U.S. PATENT DOCUMENTS

| | | | |
|---|---|---|---|
| 2002/0109784 A1 | 8/2002 | Suda et al. | |
| 2009/0244325 A1* | 10/2009 | Honjo | G02B 7/102 348/231.99 |
| 2010/0178045 A1* | 7/2010 | Hongu | G02B 7/102 396/80 |
| 2011/0032411 A1 | 2/2011 | Hirai | |
| 2011/0243540 A1* | 10/2011 | Kato | G02B 7/08 396/99 |

FOREIGN PATENT DOCUMENTS

| | | |
|---|---|---|
| EP | 2474860 A2 | 7/2012 |
| JP | 2004056691 A | 2/2004 |
| JP | 2004085674 A | 3/2004 |
| JP | 2008-227799 A | 9/2008 |

OTHER PUBLICATIONS

Combined Search and Examination Report issued in GB1404451.5 mailed on Sep. 5, 2014.
Office Action issued in Chinese Application No. 201410094012.5 mailed Apr. 28, 2016. English translation provided.

* cited by examiner

*Primary Examiner* — Twyler Haskins
*Assistant Examiner* — Fayez Bhuiyan
(74) *Attorney, Agent, or Firm* — Rossi, Kimms & McDowell LLP

(57) ABSTRACT

A lens apparatus detachably attachable to an image pickup apparatus, the lens apparatus includes a variable magnification lens arranged to move along an optical axis when changing magnification, a focus lens (105) arranged to move along the optical axis so as to perform focusing, position detection means for detecting a position of the focus lens, lens control means for acquiring normalized position information of the focus lens based on position information of the focus lens, and a memory arranged to store electronic cam data representing a position relation of the variable magnification lens and the focus lens corresponding to a plurality of object distances and, and a sensitivity of the focus lens calculated based on the normalized position information of the focus lens.

19 Claims, 7 Drawing Sheets

$d = L \times S$

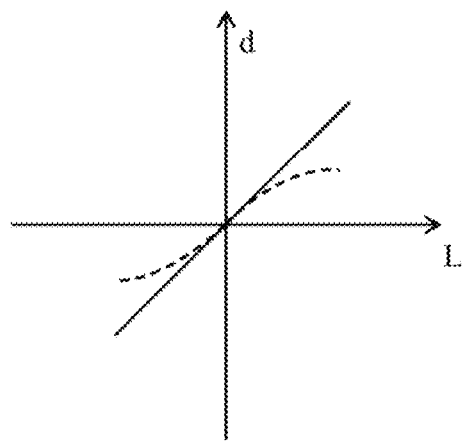
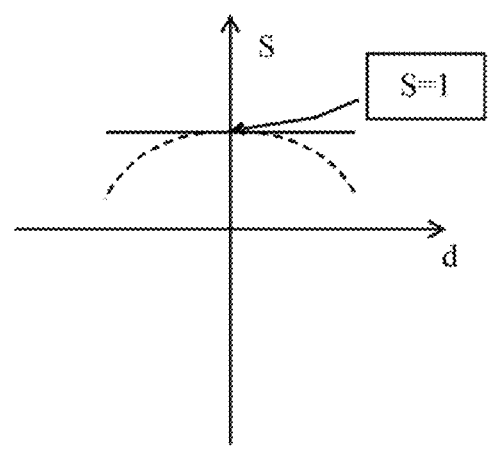
FIG. 6        FIG. 7
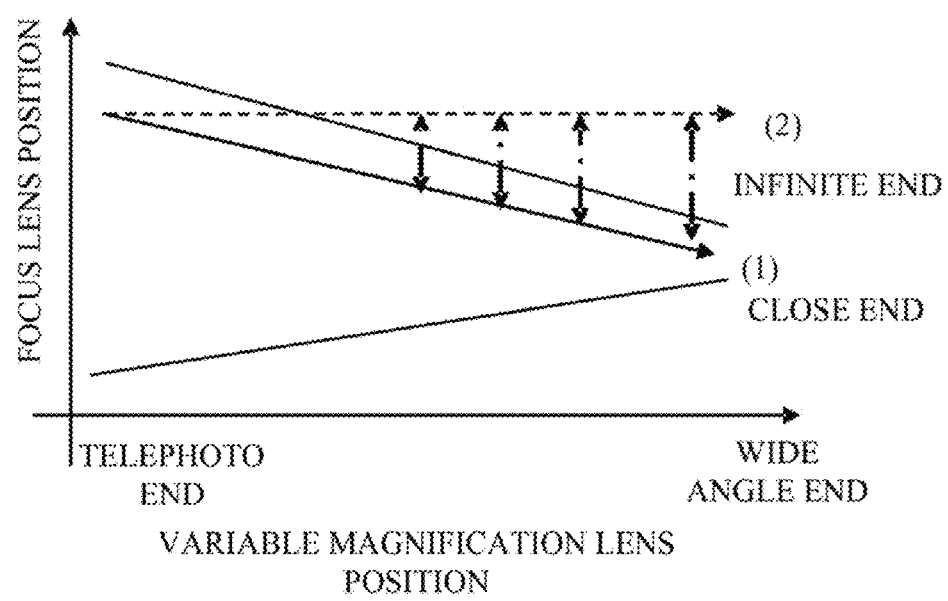
FIG. 8

LENS APPARATUS AND A CAMERA SYSTEM

BACKGROUND OF THE INVENTION

1. Field of the Invention

The present invention relates to a lens apparatus and a camera system.

2. Description of the Related Art

According to one known lens interchangeable type camera system, a camera body has an autofocus ("AF") function and a focus preset function ("FP") configured to move a focus lens to a stored position, and a lens apparatus includes a driver and a position detector of the focus lens. A current focus position (as a position of the focus lens) is transmitted from the lens apparatus to the camera body, and a target focus position or moving amount is transmitted from the camera body to the lens apparatus based upon it.

In recent years, a rear focus type lens is used in lens apparatuses compared with a front focus type lens. However, in the rear focus type lens, as a zoom position (as a position of a variable magnification lens) is changed, the focus position shifts and it is necessary to move the focus position according to the zoom position so as to focus at the same object distance. A relationship between the zoom position and the focus position is referred to as a "cam curve."

Japanese Patent Laid-Open No. ("JP") 2008-227799 discloses a method for performing focusing from a camera by object distance information so that an influence of changes of a focus position occurring as a result of correcting shifts of focus position generated by zooming decrease.

However, the method of JP 2008-227799 is not capable of applying to a camera which does not control focusing with focus pulses or object distance information.

Additionally, when minute amplitude wobbling is performed using pulse information, a camera is capable of performing the wobbling by pulse amounts taking into account a lens sensitivity relative to defocus amounts. However, like JP 2008-227799, when focusing is controlled by the object distance information, a problem occurs where the depth of field becomes shallower and a resolution of an object distance must be significantly increased occurs. Further, since it is necessary to transmit parameters regarding pulse information and object distance information to a camera from a lens, an increase of the amount of information transmitted is caused.

SUMMARY OF THE INVENTION

The present invention provides a lens apparatus and a camera system, which are capable of operating without needing changes of focus position, said changes generated to correct shifts of focus position generated by zooming.

The present invention provides as one aspect thereof a lens apparatus detachably attachable to an image pickup apparatus. The lens apparatus includes a variable magnification lens configured to move along an optical axis when changing magnification, a focus lens configured to move along the optical axis so as to perform focusing, a position detection unit configured to detect a position of the focus lens, a lens control unit configured to acquire normalized position information of the focus lens based on position information of the focus lens, and a memory unit configured to store electronic cam data representing a position relation of the variable magnification lens and the focus lens corresponding to a plurality of object distances, and a sensitivity of the focus lens calculated based on the normalized position information of the focus lens.

The present invention provides as another aspect thereof a lens apparatus detachably attachable to an image pickup apparatus. The lens apparatus includes a variable magnification lens configured to move along an optical axis when changing magnification, a focus lens configured to move along the optical axis so as to perform focusing, a position detection unit configured to detect a position of the focus lens, a memory unit configured to store electronic cam data representing a position relation of the variable magnification lens and the focus lens corresponding to a plurality of object distances, and a lens control unit configured to acquire normalized position information of the focus lens based on position information of the focus lens, and to calculate a sensitivity of the focus lens based on the normalized position information of the focus lens.

The present invention provides as another aspect thereof a camera system having a lens apparatus including a variable magnification lens configured to move along an optical axis when changing magnification, a focus lens configured to move along the optical axis direction so as to perform focusing, a position detection unit configured to detect a position of the focus lens, a lens control unit configured to acquire normalized position information of the focus lens based on position information of the focus lens, and a memory unit configured to store electronic cam data representing a position relation of the variable magnification lens and the focus lens corresponding to a plurality of object distances, and a sensitivity of the focus lens calculated based on the normalized position information of the focus lens, and an image pickup apparatus capable of detachably attaching the lens apparatus.

The present invention provides as another aspect thereof a camera system having a lens apparatus including a variable magnification lens configured to move along an optical axis direction when changing magnification, a focus lens configured to move along the optical axis direction so as to perform focusing, a position detection unit configured to detect a position of the focus lens, a memory unit configured to store electronic cam data representing a position relation of the variable magnification lens and the focus lens corresponding to a plurality of object distances, and a lens control unit configured to acquire normalized position information of the focus lens based on position information of the focus lens, and to calculate a sensitivity of the focus lens based on the normalized position information of the focus lens, and an image pickup apparatus capable of detachably attaching the lens apparatus.

The present invention provides as another aspect thereof a camera system having a lens apparatus including a variable magnification lens configured to move along an optical axis when changing magnification, a focus lens configured to move along the optical axis so as to perform focusing, and a position detection unit configured to detect a position of the focus lens, and an image pickup apparatus including a defocus detection unit configured to detect defocus amounts of the focus lens. The image pickup apparatus receives normalized position information acquired based on position information of the focus lens and a sensitivity of the focus lens calculated based on the normalized position information of the focus lens from the lens apparatus, calculates first focus lens driving amounts based on the normalized position information of the focus lens using defocus amounts detected by the defocus detection unit and the sensitivity of the focus lens, and transmits the first focus lens driving amounts to the lens apparatus. The lens apparatus converts the first focus lens driving amounts received from the image pickup apparatus to second focus lens driving amounts corresponding to a predetermined position of the variable magnification lens based on electronic cam data representing a position relation of the variable magnification lens and the focus lens corresponding to a plurality of the object distances, and drives the focus lens by the second focus lens driving amounts.

The present invention provides as another aspect thereof a camera system having a lens apparatus including a variable magnification lens configured to move along an optical axis when changing magnification, a focus lens configured to move along the optical axis so as to perform focusing, and a position detection unit configured to detect a position of the focus lens, and an image pickup apparatus including a defocus detection unit configured to detect defocus amounts of the focus lens. The image pickup apparatus receives normalized position information acquired based on position information of the focus lens from the lens apparatus, and transmits defocus amounts detected based on the normalized position of the focus lens to the lens apparatus. The lens apparatus calculates first focus lens driving amounts based on the normalized position information of the focus lens using the defocus amounts received from the image pickup apparatus and a sensitivity of the focus lens, converts the first focus lens driving amounts to second focus lens driving amounts corresponding to a predetermined position of the variable magnification lens based on electronic cam data representing a position relation of the variable magnification lens and the focus lens corresponding to a plurality of the object distances, and drives the focus lens by the second focus lens driving amounts.

The present invention provides as another aspect thereof a control method for a camera system. The camera system includes a lens apparatus including a variable magnification lens configured to move along an optical axis direction when changing magnification, a focus lens configured to move along the optical axis direction so as to perform focusing, and a position detection unit configured to detect a position of the focus lens, and an image pickup apparatus including a defocus detection unit configured to detect defocus amounts of the focus lens. The said method includes a control method for the image pickup apparatus comprising receiving normalized position information acquired based on position information of the focus lens and a sensitivity of the focus lens calculated based on the normalized position information of the focus lens from the lens apparatus, calculating first focus lens driving amounts based on the normalized position information of the focus lens using defocus amounts detected by the defocus detection unit and the sensitivity of the focus lens, and transmitting the first focus lens driving amounts to the lens apparatus, and a control method for the lens apparatus comprising converting the first focus lens driving amounts received from the image pickup apparatus to second focus lens driving amounts corresponding to a predetermined position of the variable magnification lens based on electronic cam data representing a position relation of the variable magnification lens and the focus lens corresponding to a plurality of the object distances, and driving the focus lens by the second focus lens driving amounts.

The present invention provides as another aspect thereof a control method for a camera system. The camera system includes a lens apparatus including a variable magnification lens configured to move along an optical axis direction when changing magnification, a focus lens configured to move along the optical axis direction so as to perform focusing, and a position detection unit configured to detect a position of the focus lens, and an image pickup apparatus including a defocus detection unit configured to detect defocus amounts of the focus lens. The said method includes a control method for the image pickup apparatus comprising receiving normalized position information acquired based on position information of the focus information from the lens apparatus, and transmitting defocus amounts detected based on the normalized position of the focus lens to the lens apparatus, and a control method for the lens apparatus comprising calculating first focus lens driving amounts based on the normalized position information of the focus lens using the defocus amounts received from the image pickup apparatus and a sensitivity of the focus lens, converting the first focus lens driving amounts to second focus lens driving amounts corresponding to a predetermined position of the variable magnification lens based on electronic cam data representing a position relation of the variable magnification lens and the focus lens corresponding to a plurality of the object distances, and driving the focus lens by the second focus lens driving amounts.

Further features of the present invention will become apparent from the following description of exemplary embodiments (with reference to the attached drawings).

BRIEF DESCRIPTION OF THE DRAWINGS

FIG. 6 is a diagram illustrating a relation of a defocus and driving amounts of a lens.

FIG. 7 is a diagram illustrating a relation of a sensitivity and a defocus.

FIG. 8 is a diagram illustrating a cam curve of a phase difference servo AF.

DESCRIPTION OF THE PREFERRED EMBODIMENTS

Embodiments of the present invention will be described below with reference to the accompanied drawings.

Figure 1:
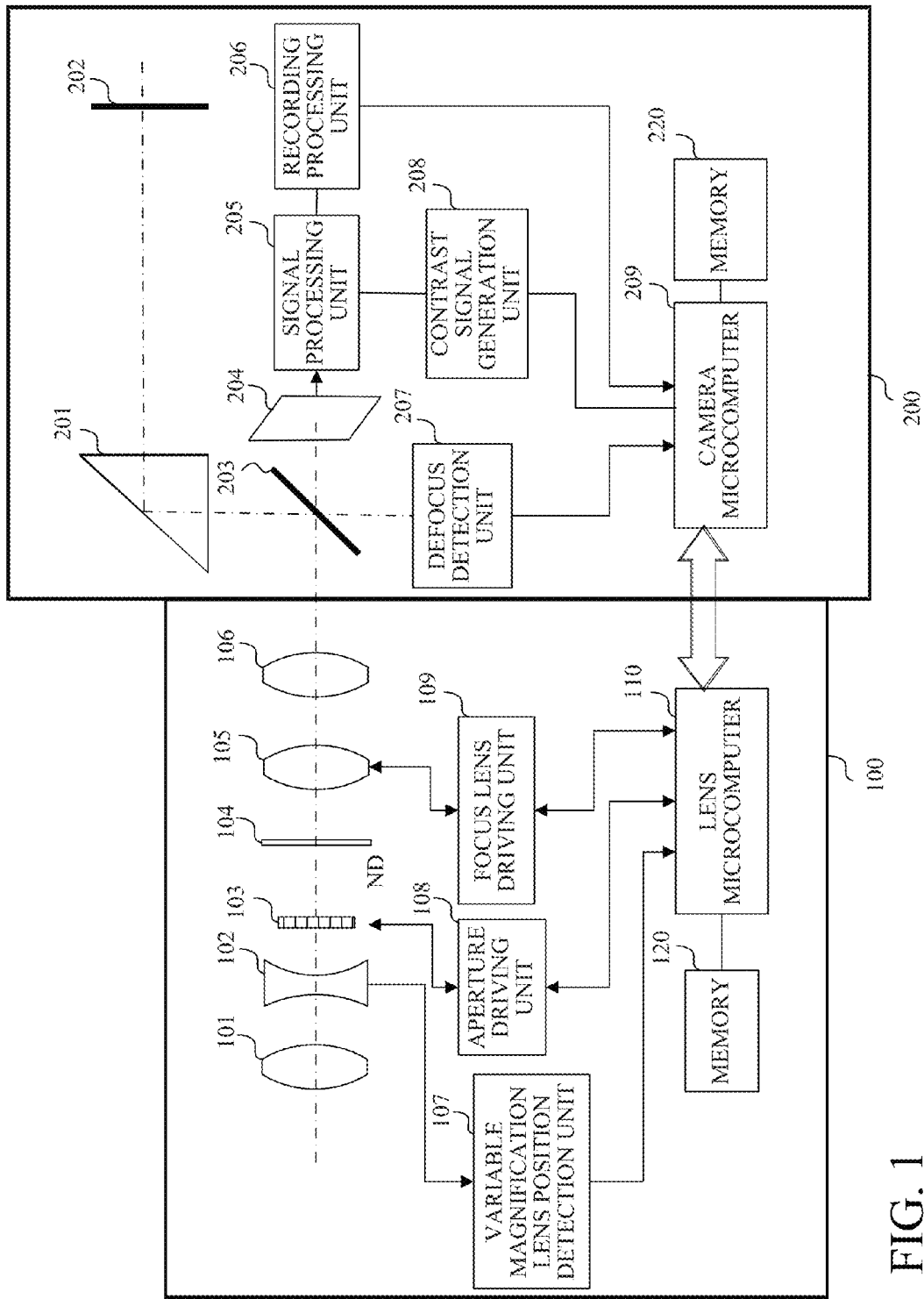
FIG. 1 is a block diagram of a camera system according to this embodiment of the present invention.

FIG. 1 is a block diagram of a camera system (image pickup system, optical apparatus) according to this embodiment of the present invention. The camera system includes a lens apparatus (optical apparatus) 100 and a camera body (image pickup apparatus or optical apparatus) 200. The lens apparatus 100 is detachably attached to the camera body 200.

The lens apparatus 100 includes an image pickup optical system, a position detection unit for a variable magnification lens 107, an aperture driving unit 108, a focus lens driving unit 109, a lens microcomputer 110, and a memory 120.

The image pickup optical system includes a plurality of lenses (optical elements), is housed in a lens barrel (not illustrated), and introduces object light to the camera body 200. The image pickup optical system includes, in order in an incident direction of object light, a first lens 101, a variable magnification lens 102, an aperture 103, an ND filter 104, a focus lens 105, and a fourth lens 106. In FIG. 1, the number of lenses included in each lens unit is not limited.

The variable magnification lens 102 is moved in an optical axis direction illustrated by a dotted line so as to adjust a focal length when a user operates an operating unit (not illustrated). The position detection unit for a variable magnification lens 107 serves as a position detection unit configured to detect a position of the variable magnification lens 102 (zoom position) using, for example, a variable resistor, and sends the position data to the lens microcomputer 110.

The aperture 103 is driven by an aperture driving unit 108 in accordance with a command of the lens microcomputer 110, and can vary its aperture value. The aperture 103 is configured to adjust a light quantity by changing its aperture value. The aperture driver 108 can use, for example, a stepping motor and a voice coil motor ("VCM"), and a detection unit (optical characteristic detection unit) configured to detect an aperture position (current aperture value) using a hall sensor configured to detect a current in the coil.

As the aperture value changes, a focus position shifts and it is thus necessary to correct the position of the focus lens 105 (focus position). In this case, an aperture value and a focus moving amount (shift amount of a focus position) can be calculated using a plurality of data corresponding to aperture positions and linear interpolation for intermediate values of the aperture positions. As provided by a focus correcting amount=A×(aperture value−maximum aperture value), the focus correcting amount can be calculated by multiplying an aperture value difference made by subtracting an aperture value when the camera is operated from an maximum aperture value by a focus temperature change rate (coefficient) A.

The ND (neutral density) filter 104 can be inserted into and ejected from an optical axis of the image pickup optical system as the user operates the operating unit (not illustrated), and is configured to adjust a light quantity. The ND detection unit (not illustrated) includes a photo interrupter, detects whether the ND filter 104 is inserted or ejected, and sends a detection result to the lens microcomputer 110. The number of ND filters 104 is not limited, and another optical element, such as a color filter, may be made selectable.

When the ND filter 104 is not inserted, the refractive index of a space in which the ND filter 104 is inserted is a refractive index of air that is exactly the optical design value but when the ND filter 104 is inserted, it is the refractive index of a material of the ND filter 104. When the ND filter 104 is inserted, a focus position shifts due to a difference between the refractive index of air and the refractive index of the ND filter 104 and it is thus necessary to correct the focus position.

In a roulette type arrangement where the ND filters 104 and the color filters having different concentrations can be switched, an insertion state of each filter is detected, and a correction value that is different according to a refractive index and a thickness of each filter is previously stored in the memory 120. The correction value to the detected filter is read out of the memory 120 and used to correct the focus position. In addition, when an undetectable filter, such as an attachment, is attached, a focus position may be corrected by freely writing a correction value/manual value selection unit (not illustrated) in the camera body through a user, and by selecting it when it is used.

The focus lens 105 is driven in the optical axis direction by the focus lens driving unit 109 in accordance with driving information (driving command) from the lens microcomputer 110 and configured to provide focusing. The lens microcomputer 110 obtains a driving amount (including the driving pulse number) and a drive position (including a target position of the focus lens 105) of the focus lens driving unit 109.

Figure 2:
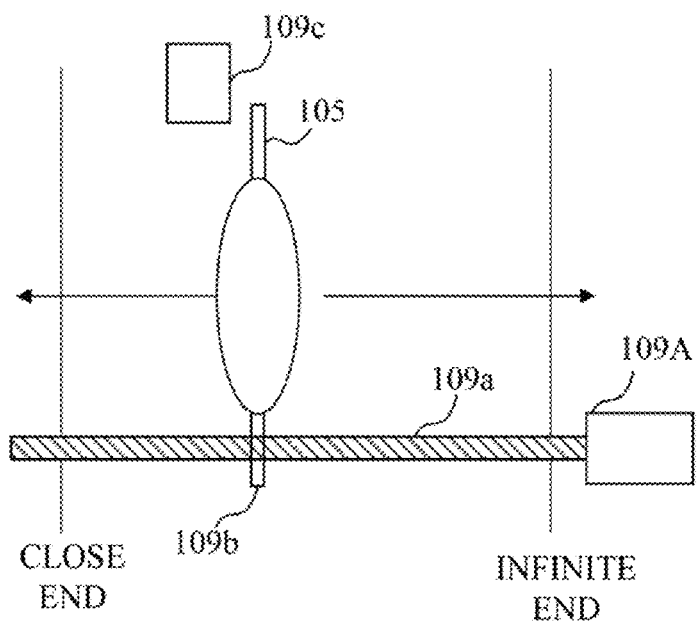
FIG. 2 is an explanatory view of a driving method of a focus lens 105.

FIG. 2 is an explanatory view of a driving method of a focus lens. The focus lens 105 is coupled with a lead screw 109a via a rack 109b. A photo interrupter 109c serves as a position detection unit configured to detect a position of the focus lens 105. When the stepping motor 109A rotates the lead screw 109a, the rotation is converted into a translational movement by the rack 109b, and as a result the focus lens 105 moves in the direction of the arrow. The position of the focus lens 105 can be detected by counting the driving pulses of the stepping motor 109A at this time. When the count starting point of the pulse is different, the position of the focus lens 105 shifts. Accordingly, the stepping motor 109A is initially driven to scan a whole range, and moved to a position at which a signal of the photo interrupter 109c changes. This point is set to an origin (reference position). The focus position based upon the photo interrupter 109c can be obtained by increasing and decreasing the driving pulse number of the stepping motor 109A from the origin.

When the focus driving unit 109 utilizes a unit in which a minimum moving amount is not set, as in a DC motor and a VCM driven by an electromagnetic operation with a magnet and a coil, the position of the focus lens 105 can be detected by separately preparing an electric position detection unit by using the electric position detection unit so as to measure a position.

The lens microcomputer (lens control unit) 110 communicates with a camera microcomputer 209 in the camera body 200, and controls each component in the lens apparatus 100. The memory 120 stores information and programs necessary for operations of the lens microcomputer 110.

The camera body 200 includes a pentaprism 201, a finder 202, a mirror 203, an image pickup element 204, a signal processing unit 205, a recording processing unit 206, a defocus detection unit 207, a contrast signal generation unit 208, a camera microcomputer 209, and a memory 220.

The mirror 203 arranged in the optical path of object light can change a direction where object light introduced from the lens apparatus 100 moves. After object light introduced from the mirror 203 is reflected by the pentaprism 201, it is introduced to the finder 202 and a user can check an optical image of the object. The mirror 203 can evacuate from the optical path using a driving apparatus (not illustrated), and the object is imaged on the image pickup element 204 when the mirror evacuate from the optical path.

A part of the mirror 203 is a half mirror, and a defocus detection unit 207 including a thorough the lens ("TTL") phase difference detection unit can measure defocus amounts using a light which passes through the mirror 203 and is introduced by a little mirror (not illustrated). Defocus amounts measured by the defocus detection unit 207 are transmitted to the camera microcomputer 209. The defocus detection unit 207 and the image pickup element 204 may be integrated so as to perform both a phase difference AF and a contrast AF with the image pickup element 204.

The image pickup element 204 is a photoelectric converter, such as a CCD sensor and a CMOS sensor, configured to photoelectrically convert an object image (optical image) formed by the image pickup optical system into an analogue signal and to output the analogue signal. The output of the image pickup element 204 is sampled, gain-controlled, and converted into a digital signal.

The signal processing unit 205 performs a variety of image processing, such as amplification, a color correction, and white balancing, for a signal from the image pickup element 204, and generates a video signal. The recording processing unit 206 outputs an image to a recording medium and a display unit.

The contrast signal generation unit 208 receives the video signal generated by the signal processing unit 205. The contrast signal generation unit 208 generates a contrast signal (image pickup signal) by utilizing one or more high frequency signal integrated values made by integrating an amount of a high frequency component extracted by a high-pass filter for a plurality of specific areas in a brightness signal. The contrast signal is utilized to a determination of focusing state. The contrast signal generation unit 208 transmits the generated contrast signal to the camera microcomputer 209.

The camera microcomputer 209 communicates with the lens microcomputer 110 at a predetermined cycle or at necessary time, sends lens control data to the lens microcomputer 110, and receives a variety of statuses from the lens microcomputer 110. The memory 220 stores information necessary for the control of the camera body 200 and the lens apparatus 100. The camera microcomputer 209 stores the position of the focus lens 105 in the memory 220, and serves as a focus preset unit configured to command the lens microcomputer 110 so as to move the focus lens 105 to the stored position of the focus lens 105. The lens microcomputer 110 controls driving of each component in accordance various lens control data received from the camera microcomputer 209.

Figure 3:
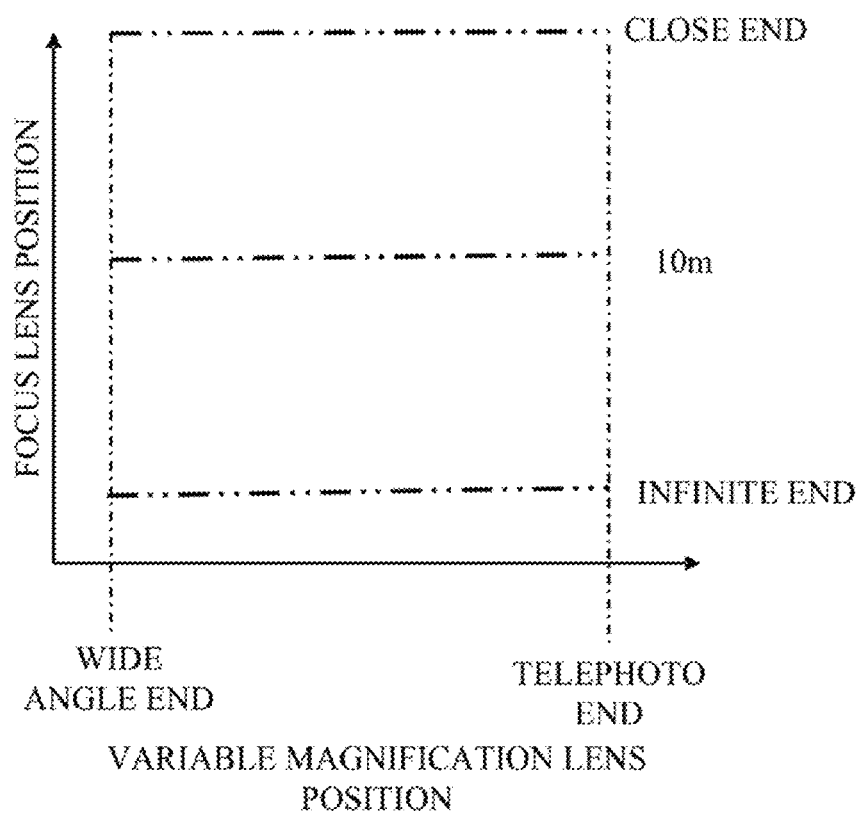
FIG. 3 is a relation diagram of a zoom position and a focus position of a front focus lens.

FIG. 3 is a relation diagram of a zoom position and a focus position of a front focus lens. The cases of the object distances of an infinite end, 10 m, and a close end are indicated. A cam groove is formed on a lens barrel so that the same focus position is maintained in the case of the same object even if the zoom position changes.

On the other hand, in order to focus at the same object distance in the case of a rear focus lens, it is necessary to move the focus lens 105 to the focus position of the focus lens corresponding to the zoom position in the cam curve. Additionally, in the rear focus lens, the resolution relative to the position from the infinite end to the close end changes according to zoom positions, and the number of pulses of the stepping motor necessary for moving from the infinite end to the close end of a telephoto end becomes about 10 times as compared with that of a wide angle end. Therefore, a focusing may not be obtained in the position stored by the preset function. There is also a problem that a movable range of the focus lens changes according to zooming.

The in-focus state can be obtained even when the zoom position changes, by storing the cam curve depending upon the object distance and the zoom position in the memory 120 and by referring to that information. A highly precise position can be calculated for a middle zoom position and a focus position other than representative points utilizing the linear interpolation.

Figure 4:
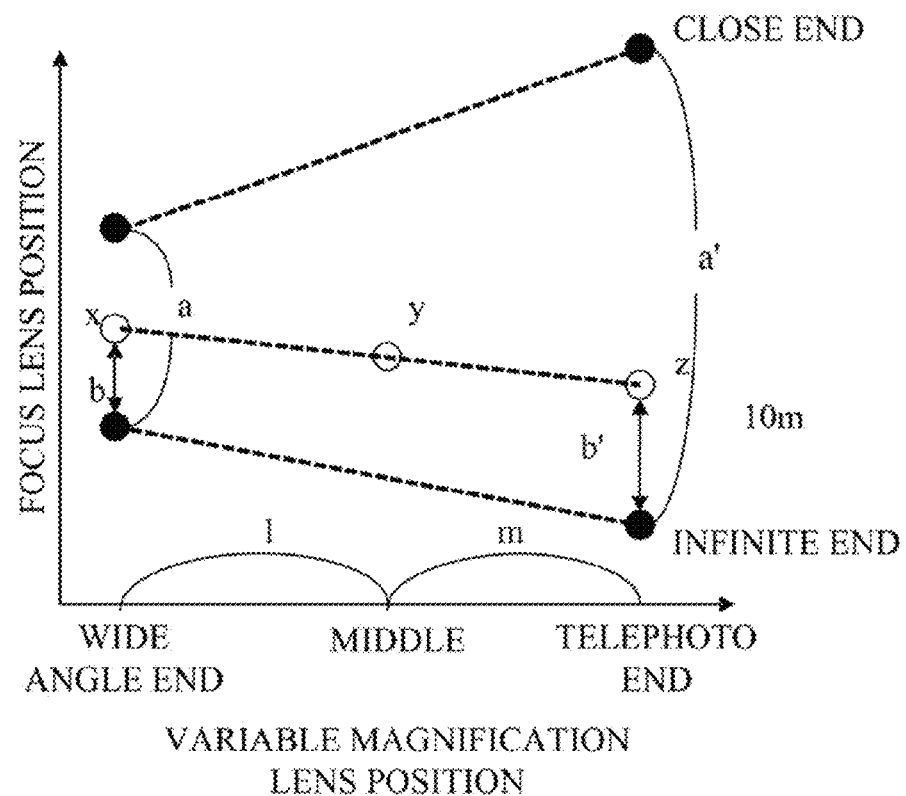
FIG. 4 is a view of an illustrative cam curve.

FIG. 4 is a view of an illustrative cam curve. A horizontal axis denotes a zoom position, where a wide angle end is set to the left side and a telephoto end is set to the right side. A vertical axis denotes a focus position, where an infinite side is set to the bottom side and the close side is set to the top side. The zoom position and the focus position for four points, such as the infinite end, the close end, the wide angle end, and the telephoto end, are stored in the memory 120.

In the following description, a zoom position is located at the wide angle end, and a current focus position is x focused upon the object distance of 10 m. Then, the zoom position is moved to a middle position, and a focus position y corresponding to the object distance of 10 m is calculated.

Since a ratio between a distance "a" between the close end and the infinite end at the wide angle end and a distance "b" between the position x and the infinite end at the wide angle end is equal to a ratio between a distance "a'" between the close end and the infinite end at the telephoto end and a distance "b'" between a position z and the infinite end at the telephoto end, the position z is calculated. Next, the focus position y is calculated based upon a ratio of a distance of l:m between a distance from the middle position to the wide angle end and a distance from the middle position to the telephoto end, the focus position x, and the focus position z. As the number of representative points used for the relationship between the object distance and the zoom position increases, the focus position can be highly precisely obtained.

Due to the individual difference of each component in the camera system, a designed cam curve may not be obtained. In order to correct the cam curve, a shift amount of the focus position from the designed value for the predetermined zoom position and the predetermined object distance is measured and stored in the memory 120 in the lens apparatus 100, and the shift is corrected in focusing. The focus shift caused by the individual difference of the optical element contains a focus shift caused by the manufacturing error for each zoom position, and a focus shift caused by the central light flux and the peripheral light flux of the lens.

Figure 5:
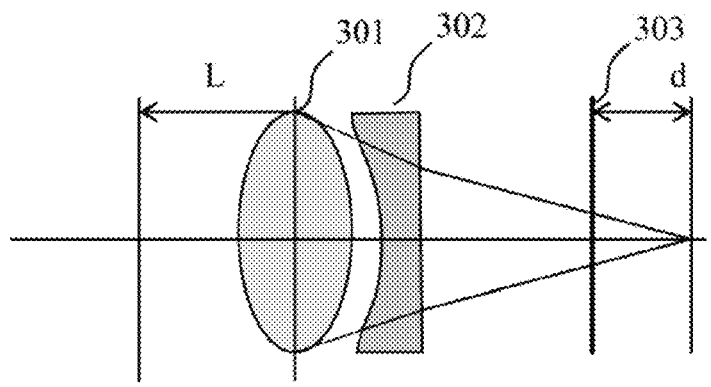
FIG. 5 is a definition view of a sensitivity.

Next, sensitivity is explained. The sensitivity represents a relationship between extension amounts of the lens and defocus amounts. FIG. 5 is a definition view of sensitivity, FIG. 6 is a diagram illustrating a relation of a defocus and driving amounts of a lens, and FIG. 7 is a diagram illustrating a relation of sensitivity and defocus.

In FIG. 5, in the case of a focus lens 301, a fixed lens group 302, and an image pickup element 303, extension amounts L of the focus lens 301 and defocus amounts d satisfy the following condition:

$$d = L \times S \quad (1)$$

At this time, a proportion coefficient S serves as a sensitivity. In the case of a lens having simple configuration, when the focus lens 301 moves by 1 mm and the defocus amount is 1 mm, the sensitivity S becomes 1.

In FIG. 6, a horizontal axis denotes the extension amounts L of the focus lens 301 and a vertical axis denotes defocus amounts d. In FIG. 7, a horizontal axis denotes the defocus amounts d and a vertical axis denotes the sensitivity S. If the relation of L:d=1:1 continues, a graph of FIG. 6 becomes a graph of proportional relation illustrated by a solid line. At this time, a graph of FIG. 7 becomes a solid line of S=1 regardless of the defocus amounts d.

However, in the case of a lens having complicate configuration, the sensitivity S and the extension amounts L are represented by the following functions of the defocus amounts d:

$$S = f(d) = S_0 + S_1 d^1 + S_2 d^2 + \ldots + S_n d^n) \quad (2)$$

$$L = d/S = d/(S_0 + S_1 d^1 + S_2 d^2 + \ldots + S_n d^n) \quad (3)$$

For example, in the case of a lens where a moving width of the defocus amounts d decrease from the relation of L:d=1:1, when the extension amounts L changes in FIG. 6, the relation between the extension amounts L and the defocus amounts d are indicated as a graph illustrated by a broken line of FIG. 6, and when the defocus amounts d changes in FIG. 7, the relation between the defocus amounts d and the sensitivity S are indicated as a graph illustrated by a broken line of FIG. 7 where the sensitivity S becomes less than 1.

The lens is not controlled by actual extension amounts L, but is controlled by the number of focus pulses ("pulse") P as follows.

$$P = \frac{L}{h} = \frac{d}{hS} \quad (4)$$

h (mm/pulse) represents lens extension amounts per pulse.

According to this embodiment, the number of pulses is calculated by the lens apparatus 100 and the camera body 200 so as to provide focus driving. Generally, in the case of an entire extension lens, the sensitivity S becomes a constant, but in the case of a lens which uses some lenses, such as a rear focus lens, for focal adjustment, the sensitivity S changes and coefficients after first order are needed. The sensitivity S basically changes according to changes of the square of a focal length, and if a focus lens moves, a focus length of lenses, such as a rear focus lens, changes. In other words, the sensitivity S varies when a variable magnification lens and a focus lens move. Additionally, the sensitivity S is divided relative to a zoom position and a focus position, is stored (normally third order) in the memory 120, and is then called for each zoom position and focus position so as to use them.

Next, a phase difference AF using the camera system of this embodiment is explained. The sensitivity at a focus position, a zoom position, and the lens extension amounts per pulse are received in advance from the lens apparatus 100. The defocus detection unit 207 measures defocus amounts of the object, and the number of focus pulses is calculated using the previously described expression (4). This data is transmitted to the lens microcomputer 110 from the camera microcomputer 209 as a driving command considering correction pulse amounts such as a narrowing focus shifts and an optical path between a phase difference sensor and an image pickup surface. The lens microcomputer 110 makes the focus lens driving unit 109 drive the focus lens 105 using the received number of focus pulses. Supposing focusing cannot be completely performed by the above driving, focusing can be performed by measuring defocus amounts by the defocus detection unit 207 and performing the same operation again.

In a servo AF photographing which makes an image pickup lens follow a moving object, the number of focus pulses is initially calculated and the image pickup lens is driven. Then, the focus position acquired from the lens microcomputer 110 is added to the number of the focus pulses, and a current object position is determined that corresponds to the focus position. As contrasted with the focus position being the position of the focus lens 105, it is called an object focus position. When a little time has passed and the object moves, the object focus position is calculated again. As a result, the previous object focus position and the current object focus position are obtained. Since they correspond to the moving of the object, the operation of the object is considered as a uniform motion. The object focus position in the case of moving the object is forecasted from differences of acquiring time of two values. And, the focus lens 105 is driven by regarding the difference value between the forecast focus position and the current focus position as the number of the focus pulses. Thus, the servo AF photographing which makes an image pickup lens follow moving object is realized.

However, when operations that follow a fixed object, perform zooming and control an angle of view are provided by the variable magnification lens using an electronic cam, the following problems happen.

FIG. 8 is a diagram Illustrating a cam curve of a phase difference servo AF. A horizontal axis denotes the variable magnification lens position, and a vertical axis denotes the focus position. An electronic cam curve is illustrated as lines which are the same object distance, respectively. In the conventional lens, when a fixed object is once focused at the telephoto end and zooming is performed, the lens microcomputer 110 transmits focus positions which are constant value as a line segment (2) in FIG. 8 to the camera microcomputer 209. However, in the lens using an electronic cam, since a focus lens is driven to the focus position corresponding to a zoom position according to the shape of the electronic cam, the lens microcomputer 110 transmits focus positions which change as a line segment (1) in FIG. 8 to the camera microcomputer 209.

When zooming is performed in the servo AF photographing, the lens microcomputer 110 transmits the value on the line segment (1) to the camera micro computer 209 although the object does not move. Further, the object focus position is calculated using the value on the line segment (1). Therefore, it is judged that the object is moved to the close side, and the camera microcomputer 209 commands the driving of the lens microcomputer 110 by differences between the line segment (1) and the line segment (2). As a result, error operations as the servo AF photographing are performed. Although driving amounts of the moving object are correctly calculated, the moving object is driven more by the differences between the line segment (1) and the line segment (2).

Figure 9:
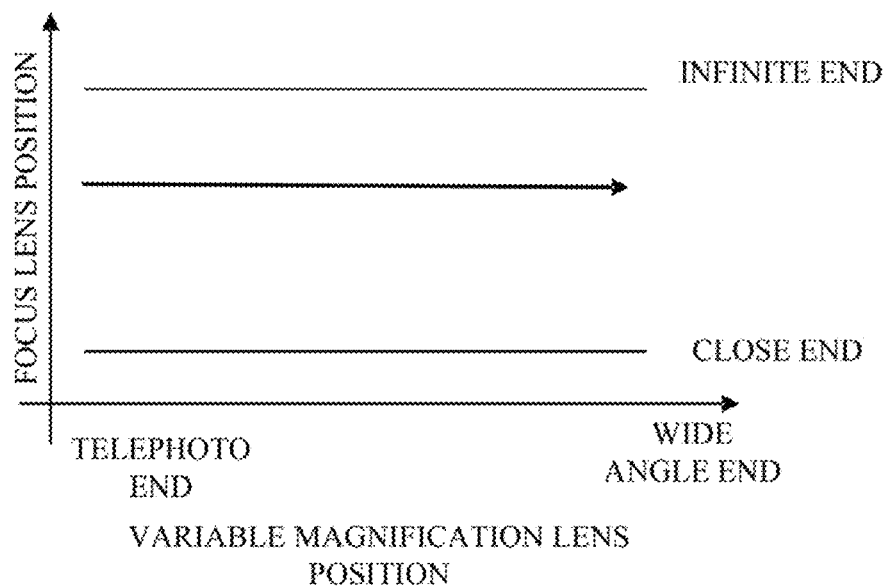
FIG. 9 is a diagram of illustrating a cam curve of a phase difference servo AF where a focus position is normalized.

In the present invention, as illustrated in FIG. 9, information about the focus position such as the number of focus pulses (position information of the focus lens) is normalized so that the focus position becomes constant according to the object distance when the zoom position changes, and the normalized focus information is transmitted to the camera body. Therefore, the servo AF during zooming can be operated correctly.

Figure 10:
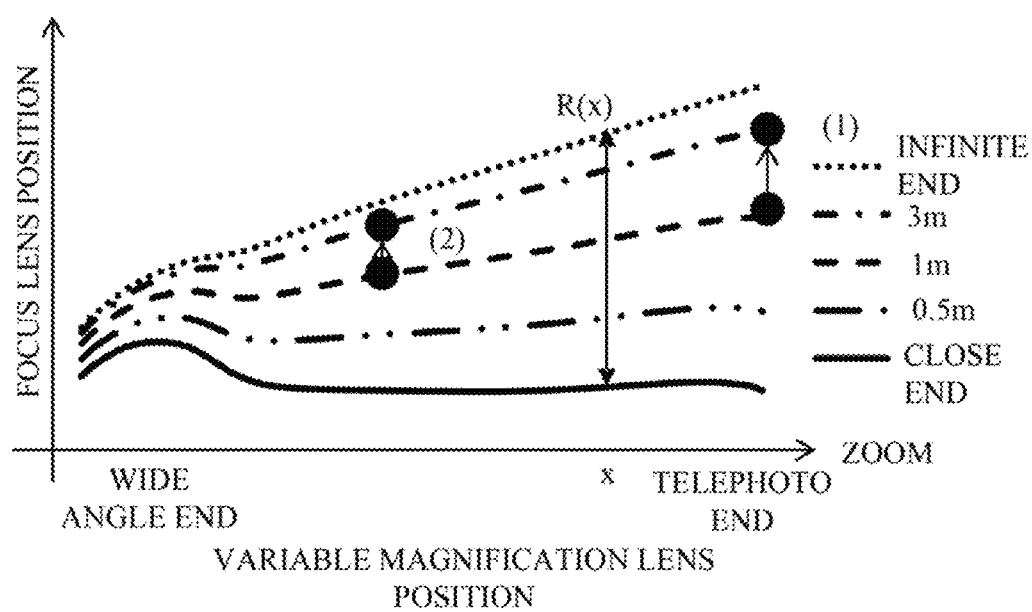
FIG. 10 is a diagram illustrating a cam curve every object distance.

Next, normalization of position information of the focus lens is explained. FIG. 10 is a diagram illustrating a cam curve every object distance. A horizontal axis denotes the variable magnification lens position, and a vertical axis denotes the focus position. An electronic cam curve is illustrated as lines which are the same object distance (infinite end. 3 m, 1 m, 0.5 m, close end), respectively. In the case of an actual interchangeable lens, as illustrated in FIG. 10, the focus position of the electronic cam representing a certain object distance becomes an irregular curve relative to the zoom position. But if the representative point corresponding to the object distance and the zoom position increases, a still more detailed focus position can be provided correctly.

In FIG. 10, when differences between the focus position at the infinite end and the close end of the zoom position x is indicated as R(x), A(x) is calculated as follows using R (Tele) which is R(x) at the telephoto end, where R(x) becomes maximum, and R(x) except R(Tele).

$$A(x)=R(\text{Tele})/R(x)$$

If normalization is performed at the wide angle end where the difference of the focus position R(x) is small, focus movement according to moving amounts per pulse exceeds FΔ which is a product of an aperture value F using a determination of the focus shifts and one pixel of the image pickup element Δ. Therefore, resolution as of one focus pulse is shortage. It is preferable that normalization is performed at a position where the resolution is the smallest, i.e., a zoom position at the telephoto end.

Figure 11:
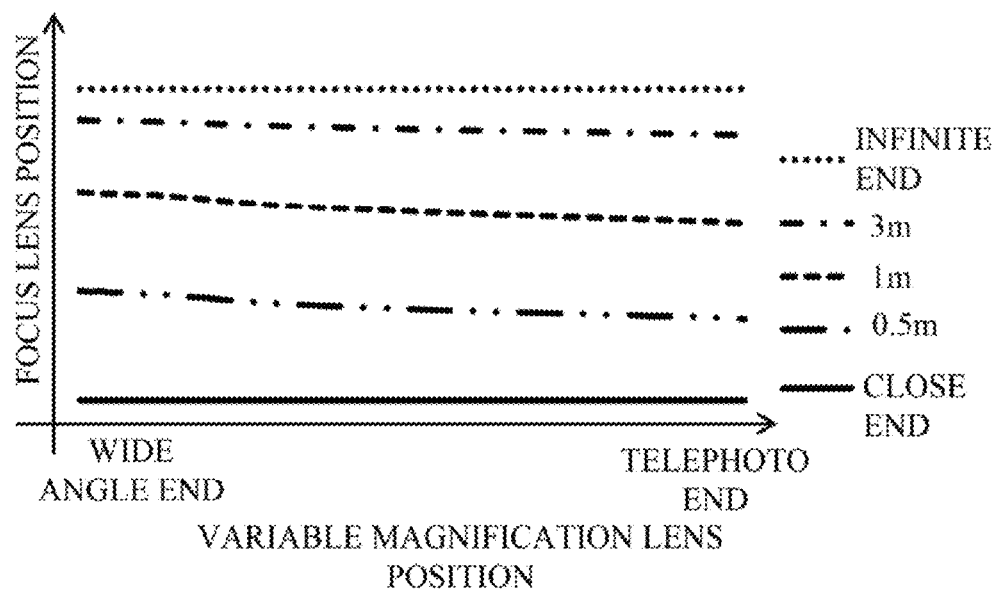
FIG. 11 is a diagram illustrating a cam curve every object distance where a focus position is easily normalized.
Figure 12:
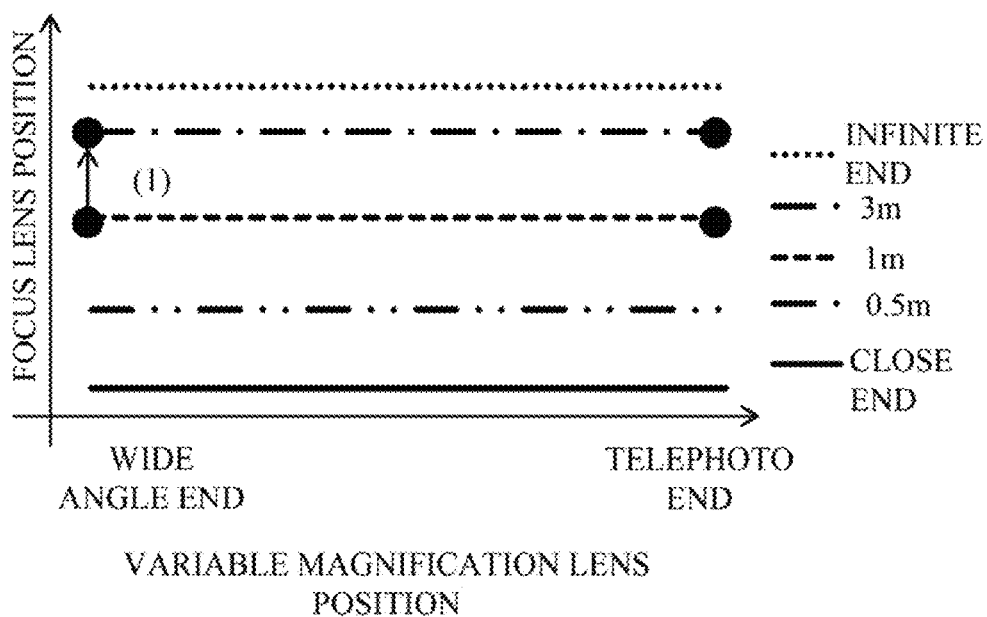
FIG. 12 is a diagram illustrating a cam curve every object distance where a focus position is normalized.

FIG. 11 is a result of multiplying the focus position on each electronic cam of FIG. 10 by A(x) FIG. 11 is a diagram illustrating a cam curve every object distance where a focus position is easily normalized. Although normalization is correctly performed at the infinite end and the close end, the electronic cam is distorted at intermediate object distances. The normalization constant A(x) is made as a variable of the zoom position, but practically, the focal length slightly changes when the focus position moves. Therefore, when y is the focus position, normalization must be essentially performed by A (x, y). FIG. 12 is a result of making a normalization constant as a variable of the zoom position and the focus position and multiplying each electronic cam by A(x, y). FIG. 12 is a diagram illustrating a cam curve every object distance where a focus position is normalized.

There is also another normalization method. Representative point data as electronic cam data is stored in the lens microcomputer 110. As explained previously, relative to a cam which is not stored in the representative points, the focus position of the same object distance in the case of changing the zoom position from the current focus position and the zoo position is calculated utilizing the linear interpolation from near representative points. And the focus position of the same object distance at the zoom position (normally telephoto end) where the difference between the focus position at the infinite end and the close end is large is calculable. Therefore, normalization as illustrated in FIG. 12 can be performed by returning the focus position of the same object distance at the zoom position where the differences between the focus position at the infinite end and the close end are large.

As a normalization method of position information of the focus lens, there are the following methods: a calculating method to acquire a normalization coefficient A(x) for normalization; a calculating method to acquire a normalization coefficient A(x, y) for normalization; and a normalization method by returning the focus position at the zoom position where differences between the focus position at the infinite end and the close end of the electronic cam are large.

According to this embodiment, the positions of the focus lens and the variable magnification lens are searched, the normalized position of the focus lens 105 is calculated from the electronic cam data in the memory 120, and the normalized position is transmitted to the camera microcomputer 209.

Next, normalization of sensitivity is explained. Normalization of sensitivity is equivalent to changing the lens extension amounts per pulse h (mm/pulse) by the position information of the focus lens or the variable magnification lens position. In normal AF, the number of focus pulses for driving of the lens is calculated using the defocus amounts acquired by the defocus detection unit 207 and the sensitivity at the current focus position transmitted from the lens apparatus 100. In other words, there is no problem in particular that the position information of the focus lens is a normalized value.

However, in the servo AF photographing during zooming, since the number of the focus pulses is calculated by the previous sensitivity, a sensitivity corresponding to the normalized position information of the focus lens is required when using the normalized position information of the focus lens.

It is thus necessary to calculate a normalized sensitivity corresponding to a normalized focus position for every finer divided area as the position information of the focus lens is normalized relative to the sensitivity corresponding to normal cam. At this time, the normalized sensitivity needs to calculate values to at least third order. The normalized sensitivity is beforehand calculated for every zoom position and focus position, and is stored in the memory 120. Accordingly, it may be called from the focus position and the zoom position when required. Or it may be initially calculated from the sensitivity corresponding to normal cam in the lens microcomputer 110.

However, in fact, errors are easily generated if the division of the focus position is small since the sensitivity is a function depending on the defocus amounts. In order to equalize resolution like the normalization in FIG. 11, the sensitivity of each degree is calculated for the sensitivity corresponding to normal cam in the lens microcomputer 110. Here, normalization is performed by multiplying the normalized coefficient A(x) and A(x, y) for normalization as the normalization of the position information of the focus lens. Or a sensitivity coefficient may be stored in the memory 120. And the normalized sensitivity is transmitted to the camera microcomputer 209, and the number of focus pulses (first focus lens driving amount) calculated using defocus amounts and the normalized sensitivity with the camera microcomputer 209 is transmitted to the lens microcomputer 110. The lens microcomputer 110 calculates the focus position at the normalized zoom position (normally telephoto end) utilizing the received number of focus pulses. And the current focus position is calculated from the electronic cam by cam calculation. Additionally, the gap of the sensitivity by normalization can be reduced if the focus lens driving unit 109 is commanded so as to drive by the differences between the focus position before normalization and the acquired focus position as actual driving amounts (second focus lens driving amount). This means calculating actual drive pulses ((2) in FIG. 10) by cam calculation of the number of focus pulses sent from the camera body 200 ((1) in FIG. 10), and correct driving can be performed by just changing the firmware in the lens microcomputer 110. If this processing is seen from the camera body 200 side, as illustrated in (1) in FIG. 12, a focus position becomes equivalent over zoom position, and the same processing as the conventional lens can be operated. Thus, in the servo AF during zooming, the correct focus driving can be performed by normalizing to a focus position and sensitivity.

In the above, the system that driving amounts of a lens is commanded with pulses was explained. However, when performing in a lens, the camera microcomputer 209 transmits defocus amounts (image surface moving amounts), sensitivity is calculated in a lens, and a lens position is sent as an image surface (defocus) amounts based on infinite in the lens.

Although defocus amounts are converted to focus moving amounts, and object focus position is calculated by adding the focus moving amounts to a focus position from a lens, a focus position from a lens may be converted by image surface (defocus).

Next, contrast AF utilizing this system is explained. The camera microcomputer 209 outputs a driving command, and the whole region is scanned so as to check focusing of the focus lens 105 based on contrast value generated in the contrast signal generation unit 208 from an image on the image pickup element 204. And the current focus position sent by communication from the lens microcomputer 110 during scanning and a focus position where the contrast value becomes maximum are searched. If maximum point extends over two points of focus position, true maximum point between two points is calculated by interpolation operation from increasing trend and decreasing trend. Next, differences between the current focus position and a position where the contrast value becomes maximum is calculated, and the camera microcomputer 209 transmits the value to the lens microcomputer 110 as a command. The lens microcomputer 110 drives the focus lens 105 by the received number of focus pulses with the focus lens driving unit 109. Even if the focus lens 105 is driven and the focusing is not performed, focusing can be performed by slightly moving the focus lens 105 and searching for the focus position where the contrast value reaches the maximum.

Although is explained a contrast value and a focus position are correlated, it may be made to correspond to an image side (defocus) position. The lens microcomputer 110 transmits an image surface (defocus) position based on infinite in a lens to the camera microcomputer 209, and the camera microcomputer 209 transmits defocus amounts to the lens micro computer 110. And the number of focus pulses can be acquired using the defocus amounts and sensitivity.

In the conventional front focus lens, it will be explained the case that contrast AF is performed relative to the still object during zooming referring to a diagram illustrating a cam curve of a contrast AF during zooming of a front focus lens of FIG. 13. As conditions, the case where zooming is gradually performed from a telephoto end to a wide angle end is considered.

Figure 13:
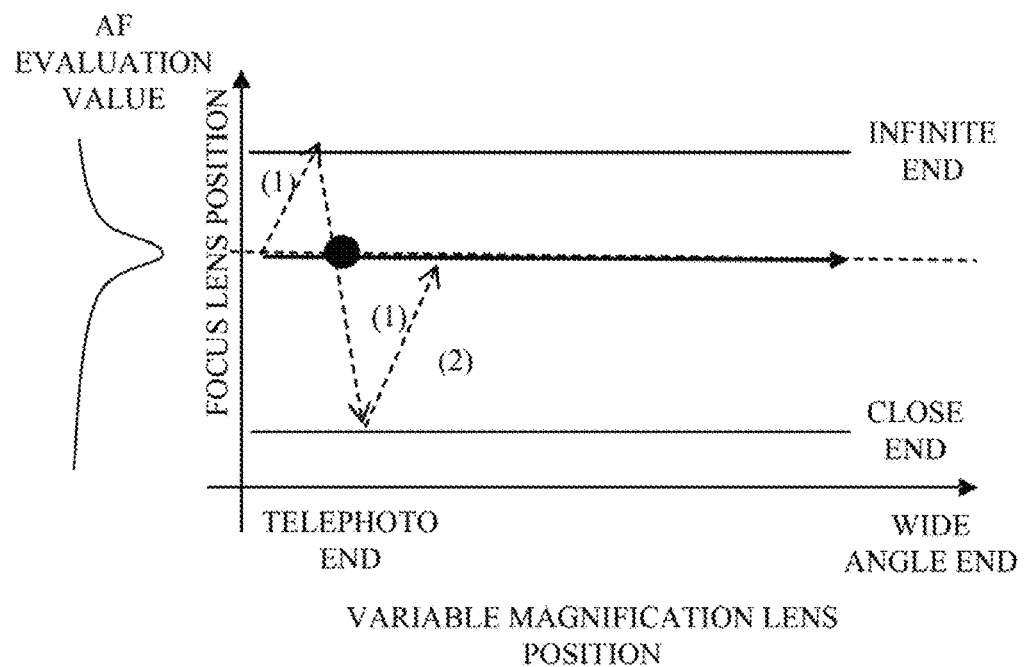
FIG. 13 is a diagram illustrating a cam curve of a contrast AF during zooming of a front focus lens.

In FIG. 13, a horizontal axis denotes the variable magnification lens position, and a vertical axis denotes the focus position. Additionally, a contrast value is described according to an AF evaluation value, and is higher on the right side. First, as a step (1), a camera makes the focus lens drive to an infinite end side, and when the focus lens arrives to the infinite end, the camera outputs a driving command to a close end side. At this time, the information correlated with a contrast value and a focus position is stored. And, at a step (2), the focus position where the contrast value reaches a maximum is determined, and the focus lens receives a driving command to the focus position. In this case, since a focus position does not change according to a zoom position, the focus lens can correctly drive to the focus position where a contrast becomes a peak.

Figure 14:
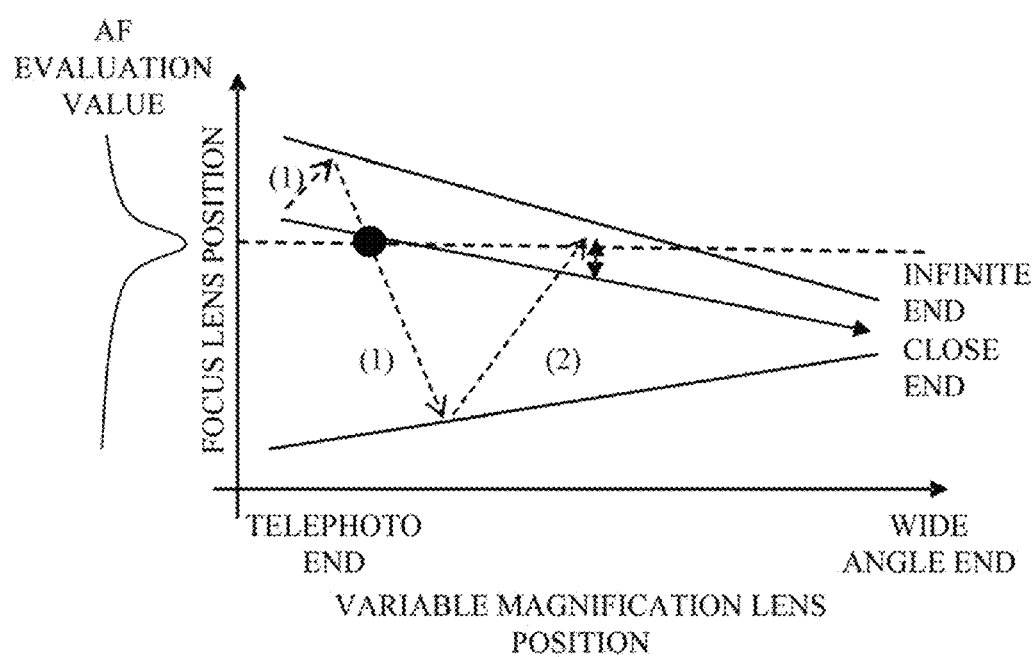
FIG. 14 is a diagram illustrating a cam curve of a contrast AF during zooming.

It will be explained a lens, such as a rear focus lens, referring to a diagram illustrating a cam curve of a contrast AF during zooming of FIG. 14. In FIG. 14, a horizontal axis denotes the variable magnification lens position, and a vertical axis denotes the focus position. Additionally, a contrast value is described according to an AF evaluation value, and is higher on the right side. First, as a step (1), a camera makes the focus lens drive to an infinite end side, and when the focus lens arrives to the infinite end, the camera outputs a driving command to a close end side. At this time, the information correlated with a contrast value and a focus position is stored. And, at a step (2), the focus position where the contrast value reaches a maximum is determined, and the focus lens receives a driving command to the focus position. However, as illustrated in FIG. 14, both focus positions of the infinite end and the close end are not constant. Therefore, the focus position where the contrast value acquired at the step (1) becomes a peak and the moved position at the step (2) are not the same object distance, and a gap occurs by the range of an arrow.

For this reason, as explained in the case of the phase difference AF, the contrast AF during zoom can be correctly performed like the front focus lens illustrated in FIG. 13 by normalizing the position information of the focus lens. Regarding the moving object, favorable AF during zooming can be similarly provided by performing a moving object prediction like the method used in the phase difference AF.

While the present invention has been described with reference to embodiments, it is to be understood that the invention is not limited to the disclosed embodiments.

This application claims the benefit of Japanese Patent Application No. 2013-054152, filed on Mar. 15, 2013, which is hereby incorporated by reference herein in its entirety.

What is claimed is:

1. A lens apparatus detachably attachable to an image pickup apparatus, the lens apparatus comprising:
    a variable magnification lens configured to move along an optical axis to change magnification;
    a focus lens configured to move along the optical axis to perform focusing;
    a position detection unit configured to detect a position of the focus lens;
    a lens control unit configured to acquire normalized position information of the focus lens; and
    a memory unit configured to store:
        electronic cam data representing a position relation of the variable magnification lens and the focus lens corresponding to a plurality of object distances; and
        a normalized sensitivity of the focus lens calculated based on the normalized position information of the focus lens,
    wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data.

2. The lens apparatus according to claim 1, further comprising:
    a stepping motor configured to drive the focus lens,
    wherein the position detection unit detects the position of the focus lens based on the number of driving pulses of the stepping motor.

3. The lens apparatus according to claim 1, wherein the lens control unit normalizes the position information in the electronic cam data based on a position of the focus lens at a position of the variable magnification lens at which a difference between positions of the focus lens at an infinite end and at a close end is the largest.

4. The lens apparatus according to claim 1, wherein the lens control unit multiplies a difference between positions of the focus lens at an infinite end and at a close end at the specific position of the variable magnification lens by a ratio of a difference between the positions of the focus lens at the infinite end and at the close end at the specific position of the variable magnification lens and a difference between the positions of the focus lens at the infinite end and at the close end at the telephoto end of the variable magnification lens to normalize the position information of the focus lens in the electronic cam data.

5. The lens apparatus according to claim 1, wherein the lens control unit multiplies a difference between positions of the focus lens at predetermined object distances at the specific position of the variable magnification lens by a ratio of a difference between the positions of the focus lens at predetermined object distances at the specific position of the variable magnification lens and a difference between the positions of the focus lens at the predetermined object distances at the telephoto end of the variable magnification lens to normalize the position information of the focus lens in the electronic cam data.

6. The lens apparatus according to claim 1, wherein the predetermined object distances are an infinite end and a close end.

7. The lens apparatus according to claim 1, wherein the lens control unit transmits the normalized position information of the focus lens and the normalized sensitivity of the focus lens to the image pickup apparatus, and receives information calculated using defocus amounts of the focus lens and the normalized sensitivity of the focus lens, the information being first focus lens driving amounts based on the normalized position information of the focus lens.

8. The lens apparatus according to claim 1, wherein the lens control unit transmits the normalized position information of the focus lens to the image pickup apparatus, receives defocus amounts of the focus lens calculated by the normalized position information of the focus lens in the image pickup apparatus, and acquires first focus lens driving amounts calculated based on the defocus amounts and the normalized sensitivity of the focus lens.

9. The lens apparatus according to claim 7, wherein the following condition is satisfied:

$$L=d/S,$$

where S represents the sensitivity of the focus lens, d represents defocus amounts of the focus lens, and L represents the first focus lens driving amounts.

10. The lens apparatus according to claim 8, wherein the following condition is satisfied:

$$L=d/S,$$

where S represents the sensitivity of the focus lens, d represents defocus amounts of the focus lens, and L represents the first focus lens driving amounts.

11. The lens apparatus according to claim 7, wherein the lens control unit converts the first focus lens driving amounts to second focus lens driving amounts using the electronic cam data and drives the focus lens by the second focus lens driving amounts.

12. The lens apparatus according to claim 8, wherein the lens control unit converts the first focus lens driving amounts to second focus lens driving amounts using the electronic cam data and drives the focus lens by the second focus lens driving amounts.

13. A lens apparatus detachably attachable to an image pickup apparatus, the lens apparatus comprising:

a variable magnification lens configured to move along an optical axis to change magnification;

a focus lens configured to move along the optical axis to perform focusing;

a position detection unit configured to detect a position of the focus lens;

a memory unit configured to store electronic cam data representing a position relation of the variable magnification lens and the focus lens corresponding to a plurality of object distances; and a lens control unit configured to:
acquire normalized position information of the focus lens based on position information of the focus lens and the electronic cam data; and
calculate a normalized sensitivity of the focus lens based on the normalized position information of the focus lens, wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data.

14. A camera system comprising:

a lens apparatus including:
a variable magnification lens configured to move along an optical axis to change magnification;
a focus lens configured to move along the optical axis direction to perform focusing;
a position detection unit configured to detect a position of the focus lens;
a lens control unit configured to acquire normalized position information of the focus lens; and
a memory unit configured to store:
electronic cam data representing a position relation of the variable magnification lens and the focus lens corresponding to a plurality of object distances; and
a normalized sensitivity of the focus lens calculated based on the normalized position information of the focus lens,
wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data; and an image pickup apparatus configured to detachably attach the lens apparatus.

15. A camera system comprising:

a lens apparatus including:
a variable magnification lens configured to move along an optical axis direction to change magnification;
a focus lens configured to move along the optical axis direction to perform focusing;
a position detection unit configured to detect a position of the focus lens;

a memory unit configured to store electronic cam data representing a position relation of the variable magnification lens and the focus lens corresponding to a plurality of object distances; and a lens control unit configured to:
  acquire normalized position information of the focus lens based on position information of the focus lens and the electronic cam data; and
  calculate a normalized sensitivity of the focus lens based on the normalized position information of the focus lens, wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data; and an image pickup apparatus configured to detachably attach the lens apparatus.

16. A camera system comprising:

a lens apparatus including:
  a variable magnification lens configured to move along an optical axis to change magnification;
  a focus lens configured to move along the optical axis to perform focusing; and
  a position detection unit configured to detect a position of the focus lens; and an image pickup apparatus including a defocus detection unit configured to detect defocus amounts of the focus lens, wherein the image pickup apparatus:
  receives normalized position information acquired based on position information of the focus lens and a normalized sensitivity of the focus lens calculated based on the normalized position information of the focus lens from the lens apparatus;
  calculates first focus lens driving amounts based on the normalized position information of the focus lens using defocus amounts detected by the defocus detection unit and the normalized sensitivity of the focus lens; and
  transmits information of the first focus lens driving amounts to the lens apparatus, wherein the lens apparatus:
  converts the first focus lens driving amounts received from the image pickup apparatus to second focus lens driving amounts corresponding to a predetermined position of the variable magnification lens based on electronic cam data representing a position relation of the variable magnification lens and the focus lens corresponding to a plurality of the object distances; and
  drives the focus lens by the second focus lens driving amounts, and wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data.

17. A camera system comprising:

a lens apparatus including:
  a variable magnification lens configured to move along an optical axis to change magnification;
  a focus lens configured to move along the optical axis to perform focusing; and
  a position detection unit configured to detect a position of the focus lens; and an image pickup apparatus including a defocus detection unit configured to detect defocus amounts of the focus lens, wherein the image pickup apparatus:
  receives normalized position information acquired based on position information of the focus lens; and
  transmits defocus amounts detected based on the normalized position of the focus lens to the lens apparatus, wherein the lens apparatus:
  calculates first focus lens driving amounts based on the normalized position information of the focus lens using the defocus amounts received from the image pickup apparatus and a normalized sensitivity of the focus lens;
  converts the first focus lens driving amounts to second focus lens driving amounts corresponding to a predetermined position of the variable magnification lens based on electronic cam data representing a position relation of the variable magnification lens and the focus lens corresponding to a plurality of the object distances; and
  drives the focus lens by the second focus lens driving amounts, and wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data.

18. A control method for a camera system, the camera system comprising a lens apparatus including a variable magnification lens configured to move along an optical axis direction to change magnification, a focus lens configured to move along the optical axis direction to perform focusing, and a position detection unit configured to detect a position of the focus lens, and an image pickup apparatus including a defocus detection unit configured to detect defocus amounts of the focus lens, method comprising the steps of:

receiving normalized position information acquired based on position information of the focus lens and a normalized sensitivity of the focus lens calculated based on the normalized position information of the focus lens from the lens apparatus;

calculating first focus lens driving amounts based on the normalized position information of the focus lens using defocus amounts detected by the defocus detection unit and the normalized sensitivity of the focus lens;

transmitting the first focus lens driving amounts to the lens apparatus;

converting the first focus lens driving amounts received from the image pickup apparatus to second focus lens driving amounts corresponding to a predetermined position of the variable magnification lens based on electronic cam data representing a position relation of the variable magnification lens and the focus lens corresponding to a plurality of the object distances; and driving the focus lens by the second focus lens driving amounts, wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data.

19. A control method for a camera system, the camera system comprising a lens apparatus including a variable magnification lens configured to move along an optical axis direction to change magnification, a focus lens configured to move along the optical axis direction to perform focusing, and a position detection unit configured to detect a position of the focus lens, and an image pickup apparatus including a defocus detection unit configured to detect defocus amounts of the focus lens, the method comprising the steps of:

receiving normalized position information acquired based on position information of the focus information from the lens apparatus;

transmitting defocus amounts detected based on the normalized position of the focus lens to the lens apparatus;

calculating first focus lens driving amounts based on the normalized position information of the focus lens using the defocus amounts received from the image pickup apparatus and a normalized sensitivity of the focus lens;

converting the first focus lens driving amounts to second focus lens driving amounts corresponding to a predetermined position of the variable magnification lens based on electronic cam data representing a position relation of the variable magnification lens and the focus lens corresponding to a plurality of the object distances; and driving the focus lens by the second focus lens driving amounts, wherein a difference between sensitivities of the focus lens at predetermined object distances at a specific position of the variable magnification lens is multiplied by a ratio of a difference between positions of the focus lens at predetermined object distances at the specific position of the variable magnification lens and a difference between positions of the focus lens at predetermined object distances at a telephoto end of the variable magnification lens to calculate the normalized sensitivity of the focus lens in the electronic cam data.

* * * * *